United States Patent
Sone et al.

(10) Patent No.: US 8,162,765 B2
(45) Date of Patent: Apr. 24, 2012

(54) CONSTANT VELOCITY UNIVERSAL JOINT

(75) Inventors: Keisuke Sone, Iwata (JP); Kazuhiko Yoshida, Iwata (JP); Hirokazu Ooba, Iwata (JP)

(73) Assignee: NTN Corporation, Osaka (JP)

( * ) Notice: Subject to any disclaimer, the term of this patent is extended or adjusted under 35 U.S.C. 154(b) by 247 days.

(21) Appl. No.: 12/518,530

(22) PCT Filed: Dec. 5, 2007

(86) PCT No.: PCT/JP2007/073490
§ 371 (c)(1),
(2), (4) Date: Jun. 15, 2009

(87) PCT Pub. No.: WO2008/072521
PCT Pub. Date: Jun. 19, 2008

(65) Prior Publication Data
US 2010/0016086 A1    Jan. 21, 2010

(30) Foreign Application Priority Data

Dec. 14, 2006  (JP) .................................. 2006-337210

(51) Int. Cl.
*F16D 3/224* (2011.01)
(52) U.S. Cl. ......................................... 464/145; 464/906
(58) Field of Classification Search ................... 464/140, 464/145, 906
See application file for complete search history.

(56) References Cited

U.S. PATENT DOCUMENTS

| | | | |
|---|---|---|---|
| 2,322,570 A * | 6/1943 | Dodge | 464/145 X |
| 4,589,857 A | 5/1986 | Okoshi | |
| 6,120,382 A | 9/2000 | Sone et al. | |
| 6,224,490 B1 | 5/2001 | Iihara et al. | |
| 6,383,082 B1 | 5/2002 | Declas | |
| 6,634,951 B2 * | 10/2003 | Sahashi et al. | 464/145 |

FOREIGN PATENT DOCUMENTS

| | | |
|---|---|---|
| JP | 60-179521 | 9/1985 |
| JP | 4-228925 | 8/1992 |
| JP | 8-121492 | 5/1996 |
| JP | 8-128454 | 5/1996 |
| JP | 9-317783 | 12/1997 |
| JP | 11-247877 | 9/1999 |
| JP | 2002-541395 | 12/2002 |

OTHER PUBLICATIONS

International Search Report issued Mar. 18, 2008 in International Application No. PCT/JP2007/073490.
International Preliminary Report on Patentability and Written Opinion of the International Searching Authority dated Jun. 25, 2009 for International Application No. PCT/JP2007/073490.

* cited by examiner

*Primary Examiner* — Gregory Binda
(74) *Attorney, Agent, or Firm* — Wenderoth, Lind & Ponack, L.L.P.

(57) ABSTRACT

In a fixed type constant velocity universal joint, a center of each of guide grooves of an outer joint member is offset to a position of being spaced apart from a joint central plane to a joint opening side by an axial distance, and is spaced apart from a joint central axis line to an opposite side in a radial direction with respect to each of the guide grooves by a radial distance. Further, a center of each of guide grooves of an inner joint member is offset to a position of being spaced apart from the joint central plane to a joint innermost side by the axial distance, and is spaced apart from the joint central axis line to the opposite side in the radial direction with respect to each of the guide grooves by the radial distance.

3 Claims, 6 Drawing Sheets

CONSTANT VELOCITY UNIVERSAL JOINT

TECHNICAL FIELD

The present invention relates to a fixed type constant velocity universal joint provided with eight torque transmitting balls.

BACKGROUND ART

A fixed type constant velocity universal joint, which has a structure for transmitting a torque by torque transmitting balls arranged in wedge-like ball tracks and for retaining and guiding the torque transmitting balls by a cage guided along a spherical inner surface of an outer joint member and a spherical outer surface of an inner joint member, is also referred to as "Rzeppa joint" (sometimes referred to as "Birfield joint" or "ball-fixed joint"). The constant velocity universal joint is widely used as a connecting joint for a drive shaft and a propeller shaft of an automobile, specifically, as a joint arranged on a fixed side (wheel side) of a drive shaft of an automobile.

In the Rzeppa joint, the wedge-like ball tracks are formed while offsetting guide grooves of the outer joint member and guide grooves of the inner joint member from the joint center. For use which requires a large operating angle, such as for use in a drive shaft joint or the like (a large operating angle equal to or larger than a maximum operating angle 45° is necessary for use in a drive shaft), normally, the guide grooves of the outer joint member are offset from the joint center to a joint opening side along a joint central axis line by a predetermined distance, and the guide grooves of the inner joint member are offset from the joint center to a joint innermost side along the joint central axis line by a predetermined distance. In this case, the joint central axis line represents a straight line including an axial line of the outer joint member and an axial line of the inner joint member in a state in which the operating angle of the joint is 0°, a joint central plane represents a plane including a center of each of the torque transmitting balls and orthogonal to the joint central axis line, and a joint center represents an intersection between the joint central plane and the joint central axis line.

As the above-mentioned Rzeppa joint, one having a structure of being provided with six torque transmitting balls has been used as a technical standard for years and supported by many users in aspects of performance, reliability, and the like. In this context, one of the inventors of the present invention has developed and already proposed an eight-ball Rzeppa joint which is made highly efficient and fundamentally lightweight and compact while securing strength, load capacity, and durability equal to or higher than those of the six-ball Rzeppa joint as the technical standard (for example, JP 09-317783A).

Further, JP 04-228925A and JP 2002-541395A disclose that, in the six-ball Rzeppa joint, the center of each of the guide grooves is offset to the position spaced apart from the joint central axis line to the opposite side in the radial direction with respect to each of the guide grooves.

That is, in JP 04-228925A, the first guide grooves of the external joint member are formed of the opening side first guide grooves about joint centers a as centers and the inner side first guide grooves about points b as centers, which are offset from the joint centers a to the opposite side in the radial direction. The second guide grooves of the interior joint member are formed of the inner side second grooves about points c as centers, which are offset from the joint centers a to the inner side along a joint central axis line L1, and the opening side second guide grooves about points d as centers, which are offset from the points c to the still opposite side in the radial direction. With this structure, the groove depth of each of the inner first guide grooves of the external joint member is increased, and the thickness of the interior joint member is increased at parts corresponding to the opening side second guide grooves. Therefore, when the joint forms a large operating angle, the problem that the balls climb onto the inner first guide grooves of the external joint member so as to chip the edge portions of the grooves is eliminated, and the problem that the interior joint member is damaged owing to load applied from the balls is eliminated.

In JP 2002-541395A, a center B of each of the guide grooves of the bell (outer joint member) and a center C of each of the guide grooves of the nut (inner joint member) are offset to the positions separated from a diametrical plane (joint central plane) P to both the sides in the axial direction by a distance d1 and separated from a joint central axis line XY to the opposite side in the radial direction by a distance d2. With this structure, in a state in which the joint forms a maximum operating angle and the balls are extremely close to the inlet edge portion of each of the guide grooves of the bell, contact force between the balls and the guide grooves is reduced, whereby damages to the inlet edge portion of each of the guide grooves are prevented.

SUMMARY OF THE INVENTION

Problem to be Solved by the Invention

In the Rzeppa joint, when the axial offset amount of the center of each of the guide grooves (axial distance between the center of each of the guide grooves and the joint central plane) is reduced or when the radial offset amount (radial distance between the center of each of the guide grooves and the joint central axis line) is provided, a peak value of track load during one rotation (load acting on the contact portion between each of the torque transmitting balls and each of the guide grooves) tends to increase. In the six-ball Rzeppa joint disclosed in JP 04-228925A and JP 2002-541395A, the radial offset is provided to the center of each of the guide grooves. While this is provided in consideration of preventing damages to a sidewall portion of each of the guide grooves in the region at a maximum operating angle or a large operating angle approximate thereto, an object to secure durability in the region at a small operating angle or the region at an intermediate operating angle is not taken into consideration at all.

It is therefore an object of the present invention to increase torque capacity, strength, and durability of the eight-ball Rzeppa joint in the region at the large operating angle while securing durability in the region at the small operating angle or the region at the intermediate operating angle, and to make the eight-ball Rzeppa joint further lightweight and compact.

It is another object of the present invention to reduce manufacturing cost of the eight-ball Rzeppa joint.

Means for Solving the Problem

In order to achieve the above-mentioned objects, the present invention provides a constant velocity universal joint including: an outer joint member having a spherical inner surface in which eight guide grooves extending arcuately in an axial direction are formed; an inner joint member having a spherical outer surface in which eight guide grooves extending arcuately in the axial direction are formed; eight torque transmitting ball tracks formed by cooperation of the guide grooves of the outer joint member and the guide grooves of the inner joint member corresponding thereto; eight torque transmitting balls respectively arranged in the eight torque transmitting ball tracks; and a cage having pockets for retaining the torque transmitting balls, in which, in a state in which an operating angle of the joint is 0°, on a definition that a straight line including an axial line of the outer joint member and an axial line of the inner joint member is a joint central axis line and that a plane including a center of each of the torque transmitting balls and orthogonal to the joint central axis line is a joint central plane, a center of each of the guide grooves of the outer joint member and a center of each of the guide grooves of the inner joint member are offset to positions of being spaced apart from the joint central plane to both axial sides, and being spaced apart from the joint central axis line to opposite sides in a radial direction with respect to each of the guide grooves.

In the above-mentioned structure, on a definition that a distance between the center of each of the guide grooves of the outer joint member or the center of each of the guide grooves of the inner joint member and the center of each of the torque transmitting balls is Rt and that an axial distance between the center of each of the guide grooves of the outer joint member or the center of each of the guide grooves of the inner joint member and the joint central plane is F, it is preferable that a ratio R1 between F and Rt (=F/Rt) fall within $0.087 \leq R1 \leq 0.1$.

Further, on a definition that an intersection between the joint central plane and the joint central axis line is a joint center and that an angle formed between a straight line, which includes the center of each of the guide grooves of the outer joint member and the joint center, and the joint central plane is $\beta(°)$, it is preferable that $15° \leq \beta < 24°$, specifically, $15° \leq \beta < 22°$ be satisfied.

Further, it is preferable that a tapered end surface of the outer joint member, which defines an edge on a joint opening side of each of the guide grooves of the outer joint member, be a surface quenched and left as it is.

The fixed type constant velocity universal joint of the present invention is suitable for a power transmission device of an automobile, in particular, a connecting joint for a drive shaft and a propeller shaft, and specifically, a connecting joint for a drive shaft.

Effects of the Invention

According to the present invention, it is possible to increase torque capacity, strength, and durability of an eight-ball Rzeppa joint in the region at the large operating angle while securing durability in the region at a small operating angle or the region at an intermediate operating angle. Further, it is possible to make the eight-ball Rzeppa joint further lightweight and compact.

Further, according to the present invention, it is possible to omit turning on a tapered end surface of the outer joint member after quenching, to thereby reduce manufacturing cost of the eight-ball Rzeppa joint.

DESCRIPTION OF REFERENCE SYMBOLS

| | |
|---|---|
| 1 | outer joint member |
| 1a | radially inner surface |
| 1b | guide groove |
| 1c | tapered end surface |
| 2 | inner joint member |
| 2a | radially outer surface |
| 2b | guide groove |
| 3 | torque transmitting ball |
| 4 | cage |
| 4c | pocket |
| P | joint central plane |
| $O_0$ | joint center |
| $O_1$ | center of guide groove of outer joint member |
| $O_2$ | center of guide groove of inner joint member |
| X | joint central axis |
| F | axial offset amount |
| Fr | radial offset amount |
| Rt | distance between center of guide groove and torque transmitting ball |
| $\beta$ | angle formed between straight line including center of guide groove of outer joint member and joint center and joint central plane |

DETAILED DESCRIPTION OF THE INVENTION

In the following, an embodiment of the present invention is described with reference to the drawings.

Figure 1:
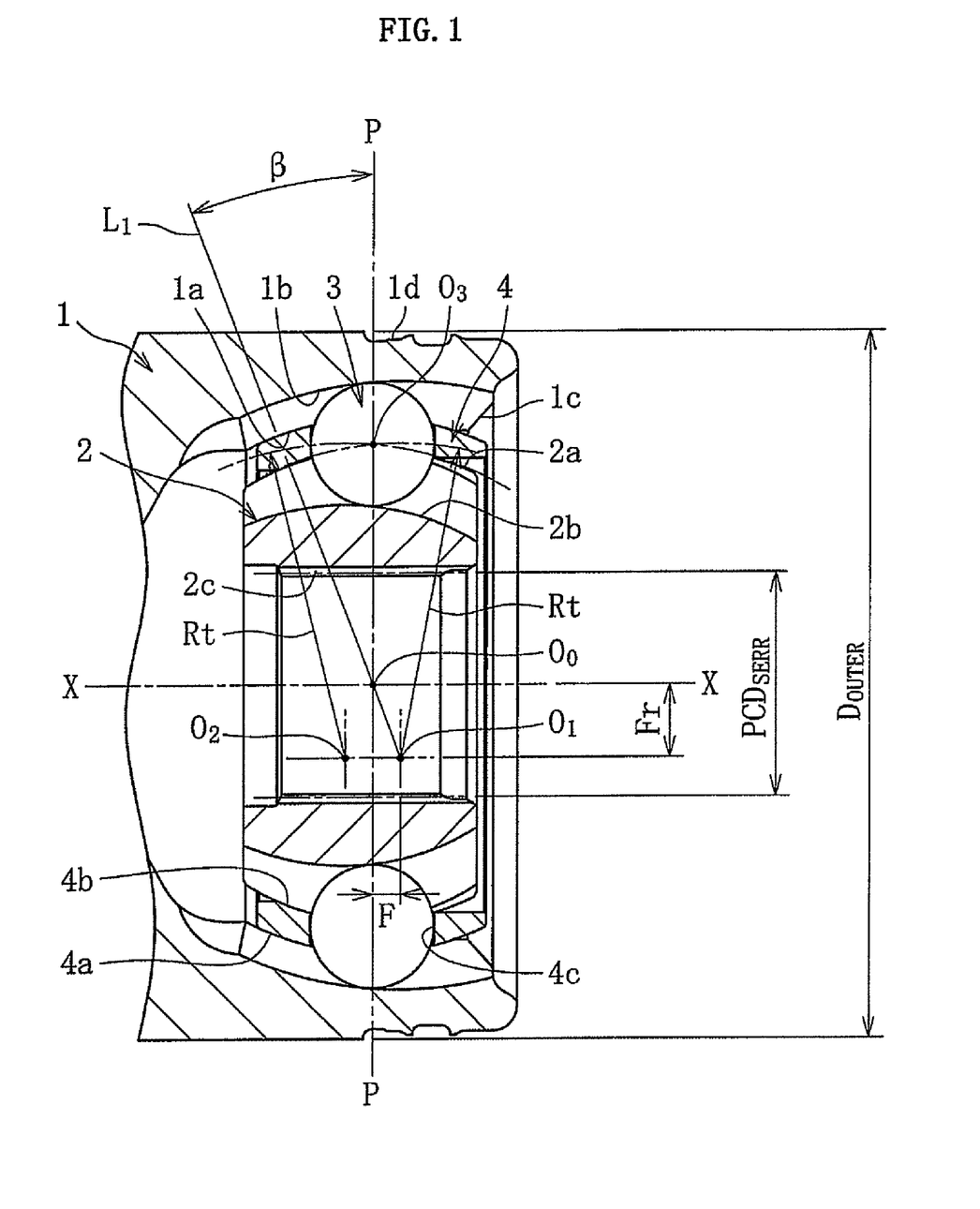
FIG. 1 is a longitudinal sectional view of a main portion of a fixed type constant velocity universal joint according to an embodiment.
Figure 2:
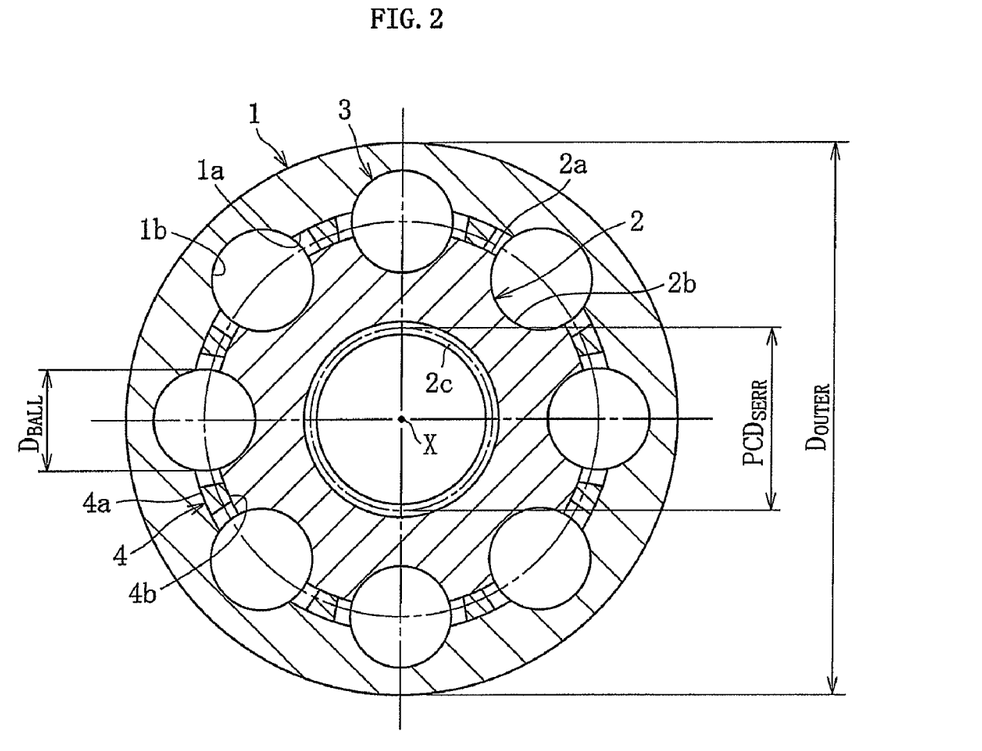
FIG. 2 is a lateral sectional view of the fixed type constant velocity universal joint according to the embodiment.

A fixed type constant velocity universal joint according to this embodiment is arranged, for example, on a fixed side of a drive shaft (wheel side) of an automobile. As illustrated in FIGS. 1 and 2, the fixed type constant velocity universal joint comprises an outer joint member 1 having a spherical inner surface 1a in which eight guide grooves 1b extending arcuately in the axial direction are formed, an inner joint member 2 having a spherical outer surface 2a in which eight guide grooves 2b extending arcuately in the axial direction are formed in the axial direction, and having an inner surface on which a tooth profile (spline or serration) 2c for connecting a shaft portion is formed, eight torque transmitting balls 3 respectively arranged in eight ball tracks formed by cooperation of the guide grooves 1b of the outer joint member 1 and the guide grooves 2b of the inner joint member 2, and a cage 4 provided with eight pockets 4c for accommodating the torque transmitting balls 3, respectively.

FIGS. 1 and 2 illustrate a state in which an operating angle θ of the joint is 0°. In this state, an axial line of the outer joint member 1 and an axial line of the inner joint member 2 correspond to each other in a straight line X, and a plane P including a center $O_3$ of each of all the torque transmitting balls 3 is orthogonal to the straight line X. In the following, the straight line X and the plane P are respectively referred to as a joint central axis line X and a joint central plane P, and an intersection $O_0$ between the joint central plane P and the joint central axis line X is referred to as a joint center $O_0$.

In this embodiment, a center $O_1$ of each of the guide grooves 1b of the outer joint member 1 is offset to a position of being spaced apart from the joint central plane P to the joint opening side (right side in FIG. 1) by an axial distance F, and being spaced apart from the joint central axis line X to the opposite side in the radial direction with respect to each of the guide grooves 1b by a radial distance Fr. Further, a center $O_2$ of each of the guide grooves 2b of the inner joint member 2 is offset to a position of being spaced apart from the joint central plane P to the joint innermost side (left side in the figure) by the axial distance F, and being spaced apart from the joint central axis line X to the opposite side in the radial direction with respect to each of the guide grooves 2b by the radial distance Fr. Therefore, each of the ball tracks formed by cooperation of the guide grooves 1b of the outer joint member 1 and the guide grooves 2b of the inner joint member 2 exhibits a shape of gradually opening in a wedge-like manner to the joint opening side. In the following, the axial distance (F) between each of the respective centers $O_1$ and $O_2$ of the guide grooves 1b and 2b and the joint central plane P is referred to as an axial offset amount F, and the radial distance (Fr) between each of the respective centers $O_1$ and $O_2$ of the guide grooves 1b and 2b and the joint central axis line X is referred to as a radial offset amount Fr. Note that, in this embodiment, the guide grooves 1b of the outer joint member 1 and the guide grooves 2b of the inner joint member 2 are equal to each other in axial offset amount F, and equal to each other in radial offset amount Fr.

Both the center of a spherical outer surface 4a of the cage 4 and the center of the spherical inner surface 1a of the outer joint member 1, which constitutes a guide surface of the spherical outer surface 4a of the cage 4, are positioned on the joint center $O_0$. Further, both the center of a spherical inner surface 4b of the cage 4 and the center of the spherical outer surface 2a of the inner joint member 2, which constitutes a guide surface of the spherical inner surface 4b of the cage 4, are positioned on the joint center $O_0$. Note that, the center of the spherical outer surface 4a of the cage 4 and the center of the spherical inner surface 4b of the cage 4 may be positioned while being separated from each other from the joint center $O_0$ to the opposite side in the axial direction by an equal distance.

When the outer joint member 1 and the inner joint member 2 are angularly displaced from each other at an angle θ, the torque transmitting balls 3 guided by the cage 4 are always maintained within a bisection plane at any operation angle θ (θ/2). As a result, constant velocity of the joint is maintained.

Figure 3:
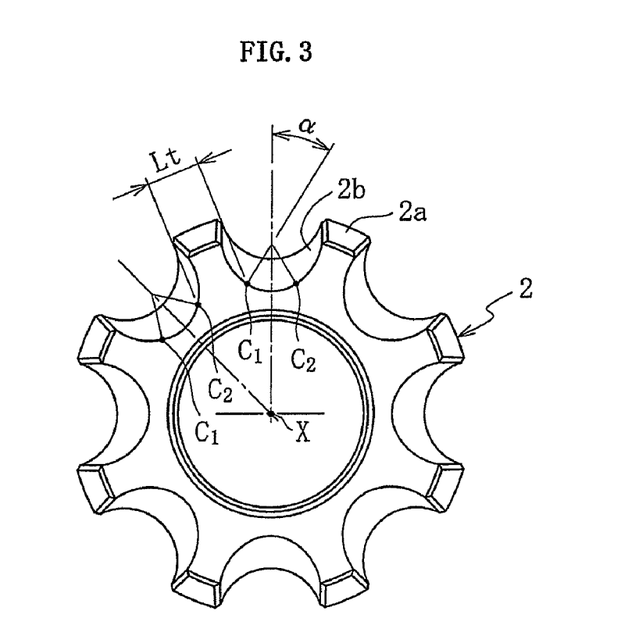
FIG. 3 is a view as seen from a joint opening side of an inner joint member.

FIG. 3 is a view of the inner joint member 2 as seen from the joint opening side. In this embodiment, each of the guide grooves 2b of the inner joint member 2 exhibits a shape of being held in angular-contact with each of the torque transmitting balls 3 at a contact angle α. Examples of the adoptable shape of each of the guide grooves 2b include a Gothic arch shape, an elliptical shape, or a parabolic shape. In the figure, positions at a contact angle α on the edge on the joint opening side of each of the guide grooves 2b are represented by points $C_1$ and $C_2$, and a shortest distance between the point $C_1$ of one of the guide grooves 2b and the point $C_2$ of adjacent one of the guide grooves 2b is represented by Lt. In the following, Lt is referred to as a guide groove distance Lt.

Figure 4:
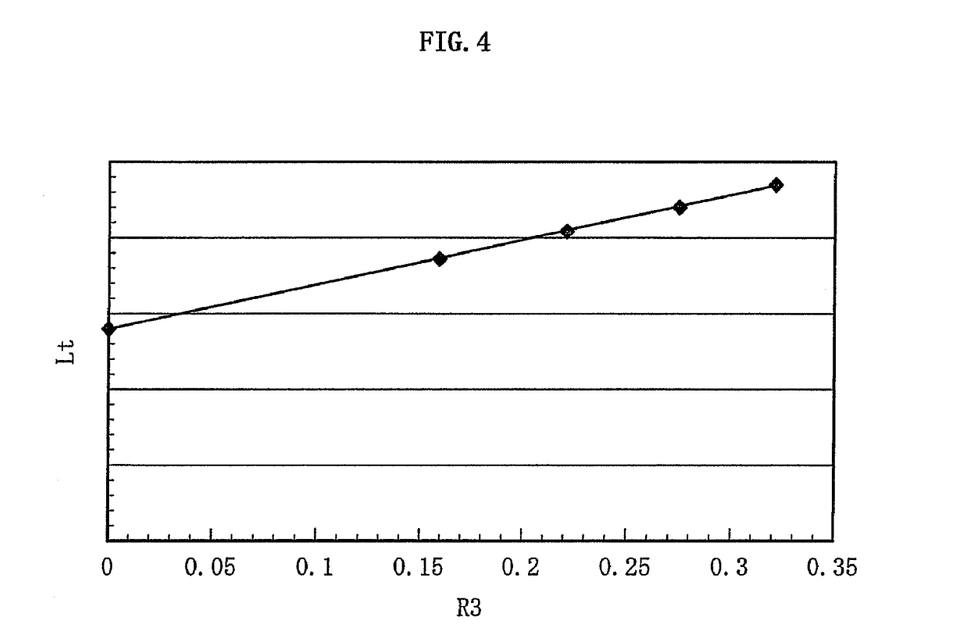
FIG. 4 is a graph showing a relation between a radial offset ratio R3 and a guide groove distance Lt in the inner joint member.

FIG. 4 shows a relation between a radial offset ratio R3 of the center $O_2$ of each of the guide grooves 2b and the guide groove distance Lt. Herein, the radial offset ratio R3 represents a ratio between the radial offset amount Fr and a distance Rt between the center $O_2$ of each of the guide grooves 2b and the center $O_3$ of each of the torque transmitting balls 3 (refer to FIG. 1) (R3=Fr/Rt). As shown in FIG. 4, the guide groove distance Lt has a tendency to increase in proportion to the radial offset ratio R3, and owing to provision of the radial offset Fr, the guide groove distance Lt relatively increases in comparison with the case where the radial offset Fr is not provided (Fr=0). As a result, the wall thickness between the portions on the joint opening side of the guide grooves 2b adjacent to each other becomes relatively large, and rigidity of the portions increases. Thus, there are increased breakage resistance of the joint opening sidewall portion of each of the guide grooves 2b and torsion resistance of the joint in the region at the large operating angle, which are exerted when the joint forms a large operating angle and each of the torque transmitting balls 3 transmits torque at a position relatively on the joint opening side of each of the guide grooves 2b.

Further, the radial offset Fr is provided at the center $O_1$ of each of the guide grooves 1b of the outer joint member 1, whereby the groove depth of the portions on the joint innermost side of each of the guide grooves 1b is relatively large in comparison with the case where the radial offset Fr is not provided. Thus, rigidity of the joint innermost sidewall portion of each of the guide grooves 1b is increased, whereby deformation of the edge portion of the joint innermost sidewall portion of each of the guide grooves 1b is suppressed, and torsion resistance of the joint in the region at the large operating angle is increased, which is exerted when the joint forms a large operating angle and each of the torque transmitting balls 3 transmits torque at a position relatively on the joint innermost side of each of the guide grooves 1b. Further, torque capacity in the region at the large operating angle is increased, and edge load in the joint innermost sidewall portion of each of the guide grooves 1b is reduced. As a result, durability of the joint in the region at the large operating angle is increased. In this context, the "torque capacity" herein represents limit torque at which, when the joint transmits torque at a certain operating angle θ, end portions of a contact ellipse of contact portions between each of the torque transmitting balls and each of the guide grooves are overlapped with edge lines of each of the guide grooves. (The edge line represents a boundary line between respective guide grooves 1b and radially inner surface 1a in the case of guide grooves 1b, and represents a boundary line between respective guide grooves 2b and radially outer surface 2a in the case of guide grooves 2b. When the edge portions of each of the guide grooves are provided with chamfers, boundary lines between each of the guide grooves and each of the chamfers are used as edge lines.)

Further, owing to the above-mentioned effects, load capacity of the outer joint member 1 is increased. Thus, the diameter of the spherical inner surface 1a of the outer joint member 1, which constitutes the guide surface of the cage 4, is increased so as to increase the thickness of the cage 4. As a result, strength of the cage 4 can be increased. Further, while maintaining the thickness of the cage 4, the diameter of the spherical outer surface 2a of the inner joint member 2 is increased so as to increase the depth of the guide grooves 2b. As a result, the load capacity of the inner joint member 2 can be increased. Owing to this, it is possible to further increase strength, load capacity, and durability of the joint. Further, while maintaining comparable strength, load capacity, and durability, it is possible to realize a still further lightweight and compact fixed type constant velocity universal joint.

Further, in this embodiment, a ratio R1 of the axial offset amount F of the center $O_1$ of each of the guide grooves 1 with respect to the distance Rt between the center $O_1$ of each of the guide grooves 1 of the outer joint member 1 and the center $O_3$ of each of the torque transmitting balls 3 (=F/Rt), and a ratio R1 of the axial offset amount F of the center $O_2$ of each of the guide grooves 2b with respect to a distance Rt between the center $O_2$ of each of the guide grooves 2b of the inner joint member 2 and the center $O_3$ of each of the torque transmitting balls 3 (=F/Rt) are each set within a range of $0.087 \leq R1 \leq 0.1$. The reason therefor is described in the following.

Generally, when a joint (Rzeppa joint) transmits torque at a certain operating angle θ, torque transmitting balls each reciprocate, in accordance with change in rotation phase angle during one rotation of the joint, between a position relatively on the joint opening side and a position relatively on the joint innermost side in a ball track. Further, a peak value of load (track load) at a contact portion between each of the torque transmitting balls and each of the guide grooves is obtained approximately at a rotation phase angle at which each of the torque transmitting balls is positioned most on the joint opening side and a rotation phase angle at which each of the torque transmitting balls is positioned most on the joint innermost side, the positioning at the rotation phase angles being performed during one rotation of the joint. The peak value of the track load has a tendency to decrease in reverse proportion to the axial offset amount F, and hence it can be said that the larger axial offset amount F is advantageous in view of track load. However, when the axial offset amount F is excessively large, the depth of each of the guide grooves is small in the region at a large operating angle, and hence torque capacity is decreased. Further, a wedge angle of each of the ball tracks is increased, whereby axial force transmitted from the ball tracks on the torque transmitting balls is large, and further, a moving amount in a radial direction and a moving amount in a circumferential direction of each of the torque transmitting balls is increased in pockets of a cage. Thus, contact force is increased at contact portions between a radially inner surface of an outer joint member and a radially outer surface of the cage, contact portions between a radially outer surface of an inner joint member and a radially inner surface of the cage, and contact portions between pocket wall surfaces of the cage and the torque transmitting balls, and friction loss of those contact portions is increased. Meanwhile, when the axial offset amount F is excessively small, the peak value of the track load is increased, with the result that durability of the joint is decreased. In this regard, in comparison with that in a six-ball Rzeppa joint in which a wedge angle of each of the ball tracks is the same, decrease in peak value of the track load in an eight-ball Rzeppa joint is confirmed by theoretical analysis and the like, which is advantageous in increasing torque capacity in the region at the large operating angle as a result of decreasing the axial offset amount F and in realizing a compact joint of high efficiency as a result of reduction in friction loss of the contact portions. An axial offset ratio R1 is set within the above-mentioned range based on those matters and theoretical analysis results described in the following.

Figure 5:
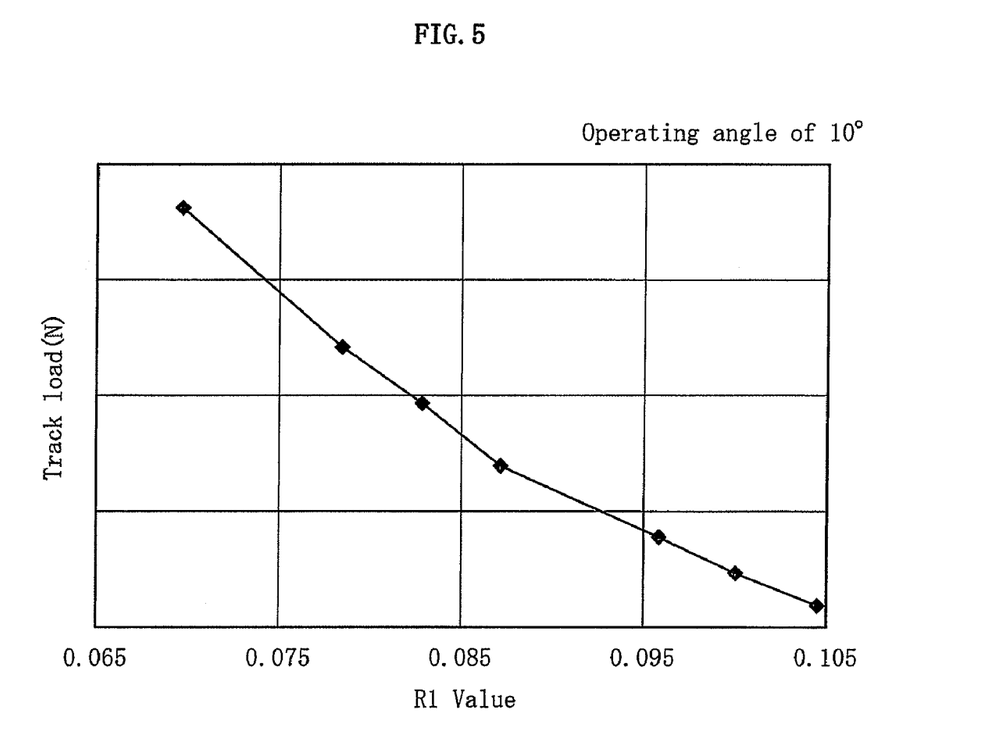
FIG. 5 is a graph showing a relation between an axial offset ratio R1 and track load at an operating angle of 10°.
Figure 6:
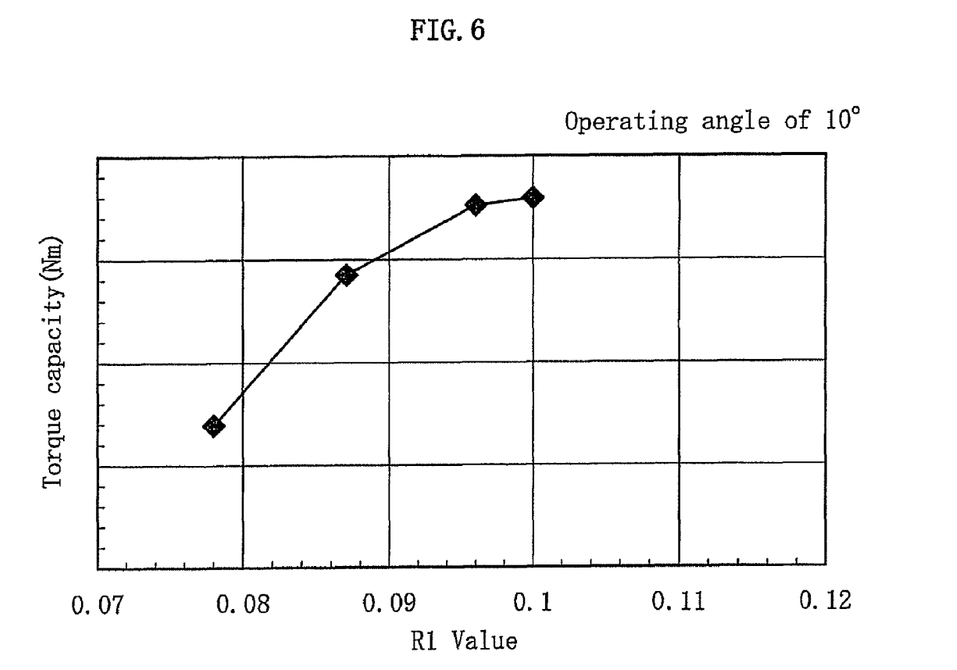
FIG. 6 is a graph showing a relation between the axial offset ratio R1 and torque capacity at an operating angle of 10°.

FIGS. 5 and 6 show a relation between the axial offset ratio R1 and track load and a relation between the axial offset ratio R1 and torque capacity, respectively, when the joint (eight-ball Rzeppa joint) transmits torque at an operating angle of 10°. Herein, the track load in FIG. 5 is the above-mentioned peak value of the track load. Further, the torque capacity in FIG. 6 is, as described above, the limit torque at which the end portions of the contact ellipse of the contact portions between each of the torque transmitting balls 3 and each of the guide grooves 1b and 2b are overlapped with the edge lines of each of the guide grooves 1b and 2b.

As shown in FIG. 5, while the track load has a tendency to decrease in reverse proportion to the axial offset ratio R1, the degree of decrease is gradual in the range of $R1 \geq 0.087$. Meanwhile, as shown in FIG. 6, while the torque capacity has a tendency to increase in proportion to the axial offset ratio R1, the degree of increase becomes gradual as R1 approximates to 0.1, and increase tends to stop approximately at 0.1.

Figure 7:
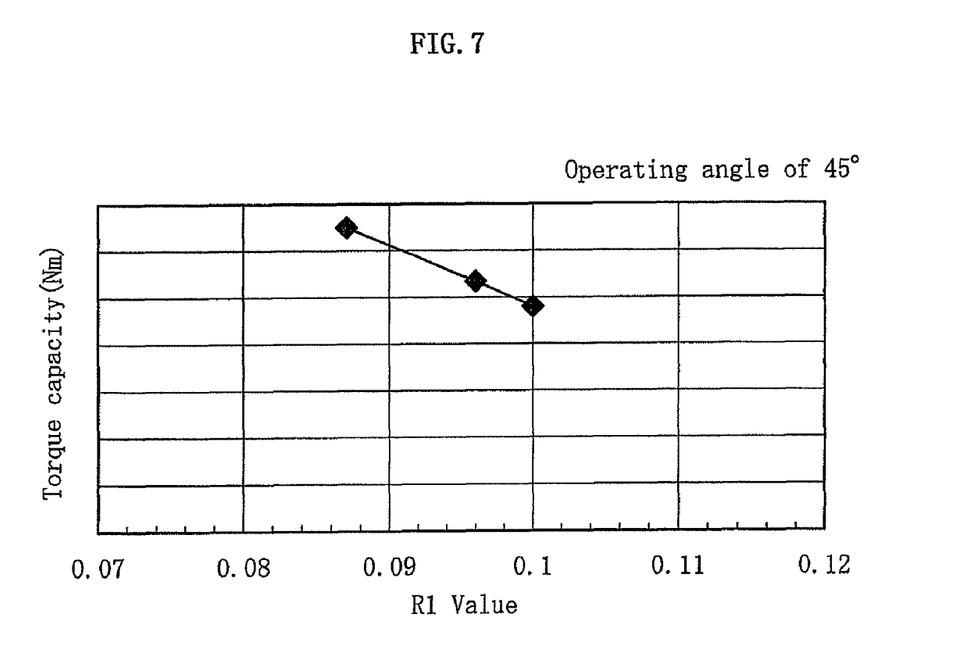
FIG. 7 is a graph showing a relation between the axial offset ratio R1 and the torque capacity at an operating angle of 45°.

FIG. 7 shows a relation between the axial offset ratio R1 and the torque capacity when the joint (eight-ball Rzeppa joint) transmits torque at an operating angle of 45°. As shown in FIG. 7, the torque capacity has a tendency to decrease in reverse proportion to the axial offset ratio R1. Accordingly, in the region at the large operating angle of 45°, the smaller axial offset R1 is advantageous.

Therefore, in the region at a small operating angle of 10°, it is preferable that the axial offset ratio R1 be set to be equal to or larger than 0.087 in which the degree of decreasing the track load is gradual and set to be equal to or smaller than 0.1 in which the increase in torque capacity tends to stop. Further, R1 is set to be equal to or smaller than 0.1, whereby torque capacity in the region at the large operating angle of 45° can be secured.

Further, in this embodiment, an angle β (refer to FIG. 1) formed between a straight line L1 and the joint central plane P is set within the range of $15° \leq β < 24°$, the straight line L1 including the center $O_1$ of each of the guide grooves 1b of the outer joint member 1 and the joint center $O_0$. This is for the following reason.

Figure 8:
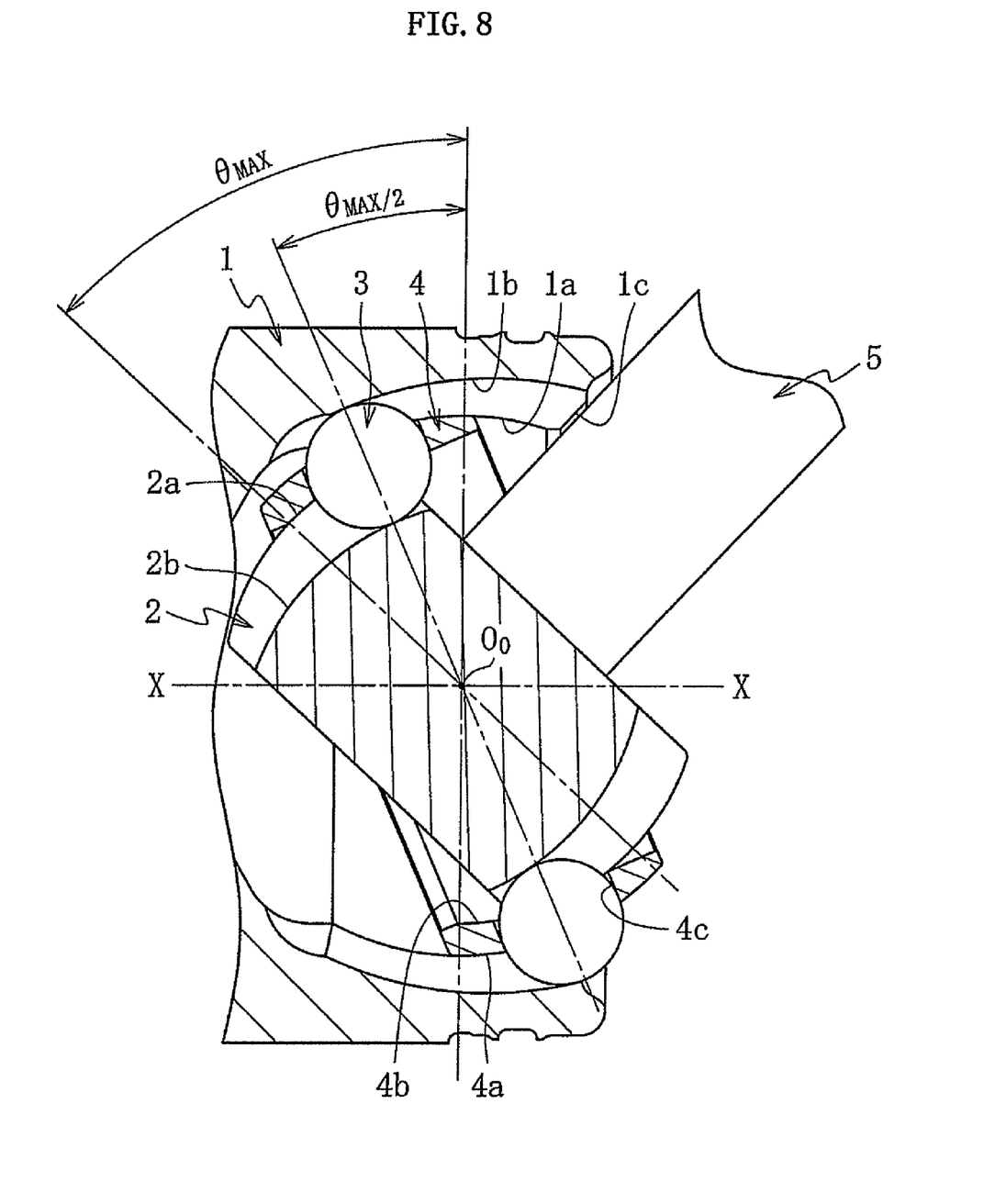
FIG. 8 is a longitudinal sectional view of a main portion, illustrating a state in which a joint forms a maximum operating angle $\theta_{MAX}$.

That is, the depth of the guide grooves 1b of the outer joint member 1 is smallest when the center $O_3$ of each of the torque transmitting balls 3 is positioned on the straight line L1. Accordingly, in view of increase in durability of the joint, it is preferable that the position of the straight line L1 on which the depth of the guide grooves 1b is smallest be set in the region at an operating angle, in which use frequency thereof is low when the joint is mounted to a vehicle. The joint in this embodiment forms a maximum operating angle $θ_{MAX}$ of 47°, (FIG. 8 illustrates a state in which the joint forms the maximum operating angle $θ_{MAX}$), and use frequency of the joint mounted to a vehicle in the region at the large operating angles of 30° to 47° is relatively low. Further, the angle β of the straight line L1 is approximately a half of the operating angle θ. Accordingly, it is preferable that the angle β of the straight line L1 be set within the range of $15° \leq β < 24°$.

Actually, in many cases, an upper limit of a use operating angle of the joint mounted to the vehicle is set to 43° to 45° so as to be sufficiently smaller than the maximum operating angle $θ_{MAX}=47°$ of the joint itself by 2° to 4°. Further, such as the cases of parking or making U-turn, there are relatively many cases in which a minimum rotational radius of a wheel is necessary, and there are also relatively many cases in which the joint forms an upper limit of a use operating angle. Accordingly, it is preferable that the position of the straight line L1 be prevented from corresponding to the position of the upper limit of the use operating angle. Further, when the axial offset amount F is made equal thereto, the radial offset amount Fr is increased in reverse proportion to the angle β, and the radial offset ratio R3 is also increased. Further, as shown in FIG. 4, when as the radial offset ratio R3 is increased, the guide groove distance Lt of the inner joint member 2 is increased, and rigidity of the joint opening sidewall portion of each of the guide grooves 2b is increased.

In consideration of those circumstances, in accordance with an operating angle range of 30° to 43° of low use frequency, it is more preferable to set the angle β within the specific range of $15° \leq \beta < 22°$.

Figure 9:
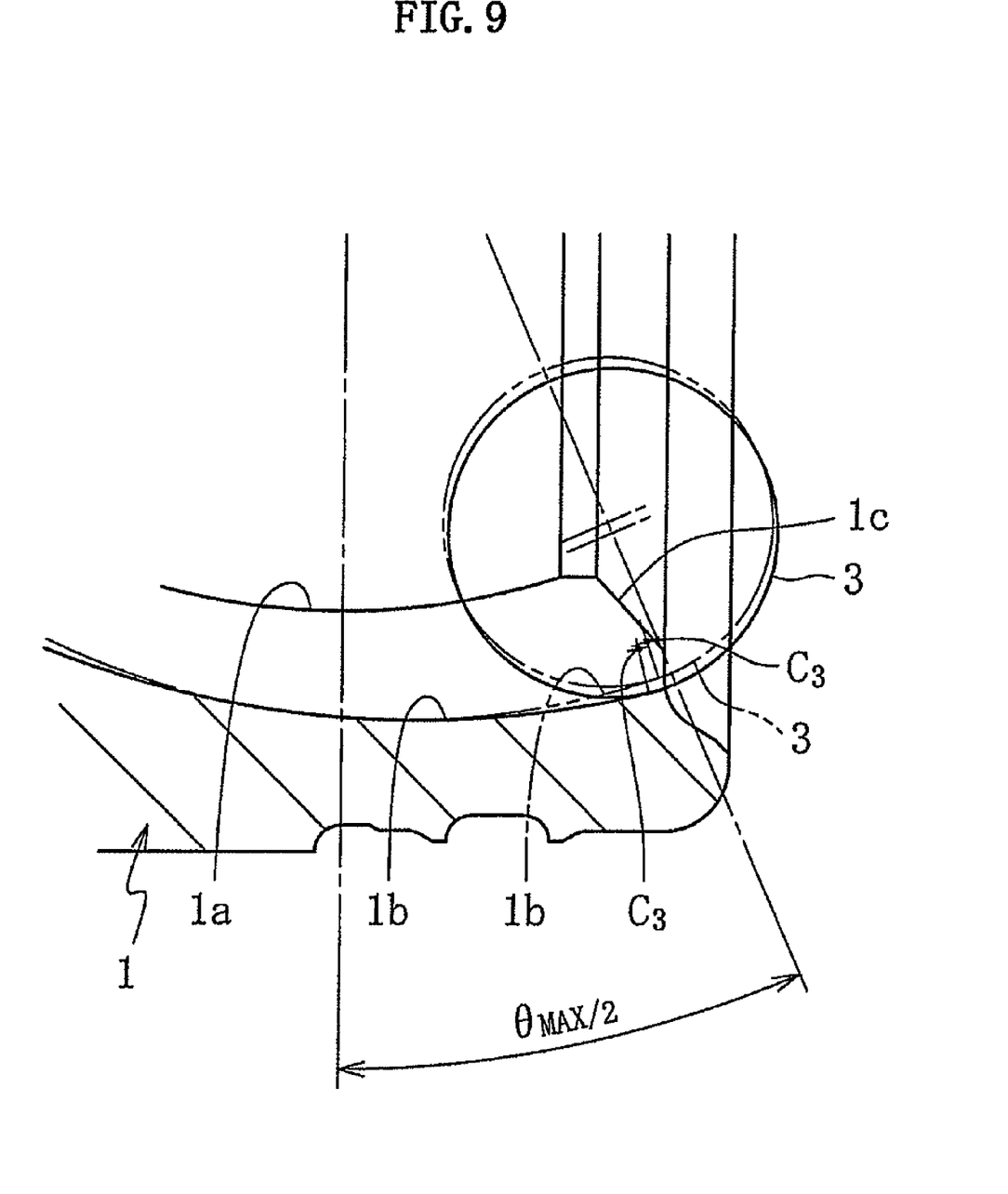
FIG. 9 illustrates a state in which, when the joint forms the maximum operating angle $\theta_{MAX}$, a torque transmitting ball reaches a position most on the joint opening side in a guide groove of an outer joint member.

FIGS. 8 and 9 illustrate a state in which the joint according to this embodiment forms the maximum operating angle $\theta_{MAX}$. When the joint transmits a torque at the maximum operating angle $\theta_{MAX}$ in accordance with change in rotation phase angle during the rotation of the outer joint member 1, each of the torque transmitting balls 3 consequently reciprocates between the position most on the joint opening side and the position most on the joint innermost side in each of the guide grooves 1b of the outer joint member 1. FIG. 9 illustrates a state in which one of the torque transmitting balls 3 reaches the position most on the joint opening side in one of the guide grooves 1b of the outer joint member 1. Two-dot chain lines in the figure indicate the position of the groove bottom of the one of the guide grooves 1b and the position of the one of the torque transmitting balls 3 in the case where the radial offset amount Fr is not provided to the center $O_1$ of the one of the guide grooves 1b of the outer joint member 1. As illustrated in the figure, when the radial offset amount Fr is provided to the center $O_1$ of the one of the guide grooves 1b of the outer joint member 1, the groove bottom of the one of the guide grooves 1b is consequently positioned on the still radially outer side on the joint opening side in comparison with that in the case where the radial offset amount Fr is not provided thereto. Thus, a contact point C3 between the one of the torque transmitting balls 3 and the one of the guide grooves 1b, which is obtained when the one of the torque transmitting balls 3 reaches the position most on the joint opening side of the one of the guide grooves 1b, moves on the joint innermost side relatively from a contact point C4 of the case where the radial offset amount Fr is not provided thereto. As a result, a separation distance measured from a tapered end surface 1c of the outer joint member 1, which defines the edge on the joint opening side of the one of the guide grooves 1b, is increased. In this case, when the joint forms a large operating angle, the tapered end surface 1c of the outer joint member 1 constitutes a surface which interferes with a shaft portion 5 coupled with the inner joint member 2 (refer to FIG. 8). In order to secure a maximum operating angle $\theta_{MAX}$ of the joint, normally, the outer joint member 1 is turned after being quenched so that deformation at the time of quenching can be corrected. In this embodiment, as described above, the separation distance between the contact point C3 of each of the torque transmitting balls 3 and the tapered end surface 1c is increased. Thus, the tapered end surface 1c is formed in a shape determined in consideration of deformation at the time of quenching (shape before quenching), whereby it is possible to omit turning on the tapered end surface 1c after quenching while securing a maximum operating angle $\theta_{MAX}$ of the joint. As a result, manufacturing cost thereof can be reduced.

In addition to the above-mentioned configuration, in this embodiment, a ratio r1 between a pitch circle diameter $PCD_{BALL}$ and a diameter $D_{BALL}$ of each of the torque transmitting balls 3 ($=PCD_{BALL}/D_{BALL}$) is set within a range of $3.3 \leq r1 \leq 5.0$, or preferably, $3.5 \leq r1 \leq 5.0$. In this case, the pitch circle diameter $PCD_{BALL}$ represents a value obtained from $PCD_{BALL}=2\times(Rt-Fr)$. Further, a ratio r2 between an outer diameter $D_{OUTER}$ of the outer joint member 1 and a pitch circle diameter $PCD_{SERR}$ of the serration (or spline) 2c of the inner joint member 2 ($=D_{OUTER}/PCD_{SERR}$) is set within a range of $2.5 \leq r2 \leq 3.5$, or preferably, $2.5 \leq r2 < 3.2$. In this case, as illustrated in FIG. 1, when a fixation groove 1d is formed on the outer periphery of the outer joint member 1 so as to fix a boot to a position corresponding to the joint central plane P, the outer diameter $D_{OUTER}$ is defined as a diameter which is located on the joint innermost side relatively to the joint central plane P and measured at the position at which the fixation groove 1d does not exist.

Note that, in the above-mentioned embodiment, the center $O_1$ of each of the guide grooves 1b of the outer joint member 1 is spaced apart from the joint central plane P to the joint opening side by the axial distance F, and the center $O_2$ of each of the guide grooves 2b of the inner joint member 2 is spaced apart from the joint central plane P to the joint innermost side by the axial distance F. However, conversely, it is also possible to space the center $O_1$ of each of the guide grooves 1b of the outer joint member 1 apart from the joint central plane P to the joint innermost side by the axial distance F, and possible to space the center $O_2$ of each of the guide grooves 2b of the inner joint member 2 apart from the joint central plane P to the joint opening side by the axial distance F. In this case, each of the ball tracks formed by cooperation of the guide grooves 1b of the outer joint member 1 and the guide grooves 2b of the inner joint member 2 exhibits a shape of gradually opening in a wedge-like manner to the joint innermost side. Alternatively, the ball tracks each having the shape of gradually opening in a wedge-like manner to the joint opening side and the ball tracks each having the shape of gradually opening in a wedge-like manner to the joint innermost side may be alternately arranged in a rotational direction.

The invention claimed is:

1. A constant velocity universal joint, comprising:
an outer joint member having a spherical inner surface in which eight guide grooves extending arcuately in an axial direction are formed;
an inner joint member having a spherical outer surface in which eight guide grooves extending arcuately in the axial direction are formed, the eight guide grooves of the inner joint member and the eight guide grooves of the outer joint member corresponding respectively and forming eight torque transmitting ball tracks;
eight torque transmitting balls respectively arranged in the eight torque transmitting ball tracks; and
a cage having pockets for retaining the torque transmitting balls,
wherein, in a state in which an operating angle of the constant velocity universal joint is 0°, with a definition that a straight line collinear with an axial line of the outer joint member and an axial line of the inner joint member is a joint central axis line and that a plane intersecting a center of each of the torque transmitting balls and orthogonal to the joint central axis line is a joint central plane, a center of each of the guide grooves of the outer joint member and a center of each of the guide grooves of the inner joint member are offset to positions that are spaced apart from the joint central plane to both axial sides, and are spaced apart from the joint central axis line to opposite sides in a radial direction with respect to each of the guide grooves,
wherein, with a definition that a distance between the center of each of the guide grooves of the outer joint member or the center of each of the guide grooves of the inner joint member and the center of each of the torque transmitting balls is Rt and that an axial distance between the center of each of the guide grooves of the outer joint member or the center of each of the guide grooves of the inner joint member and the joint central plane is F, a ratio R1 between F and Rt ($=F/Rt$) is $0.087 \leq R1 \leq 0.1$, and wherein, with a definition that a point at which the joint central axis line intersects the joint central plane is a joint center and that an angle formed between a straight line, which intersects the center of each of the guide grooves of the outer joint member and the joint center, and the joint central plane is β (°), $15° \leqq β < 24°$ is satisfied.

2. A constant velocity universal joint according to claim 1, wherein the outer joint member has a tapered end surface, which defines an edge on a joint opening side of each of the guide grooves of the outer joint member, that is surface quenched.

3. A constant velocity universal joint according to claim 1, which is used for coupling of a drive shaft of an automobile.

* * * * *